United States Patent
Hall et al.

(10) Patent No.: US 11,010,911 B1
(45) Date of Patent: May 18, 2021

(54) MULTI-CHANNEL DEPTH ESTIMATION USING CENSUS TRANSFORMS

(71) Applicant: Facebook Technologies, LLC, Menlo Park, CA (US)

(72) Inventors: Michael Hall, Bellevue, WA (US); Xinqiao Liu, Medina, WA (US); Zhaoming Zhu, Redmond, WA (US); Rajesh Lachhmandas Chhabria, San Jose, CA (US); Huixuan Tang, Redmond, WA (US); Shuochen Su, Seattle, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 97 days.

(21) Appl. No.: 16/417,872

(22) Filed: May 21, 2019

Related U.S. Application Data

(60) Provisional application No. 62/674,430, filed on May 21, 2018.

(51) Int. Cl.
  *G06T 7/00* (2017.01)
  *G06T 7/593* (2017.01)
  *H04N 13/239* (2018.01)

(52) U.S. Cl.
  CPC ........... *G06T 7/593* (2017.01); *H04N 13/239* (2018.05)

(58) Field of Classification Search
  CPC .. G06T 7/593; G06T 7/90; G06T 7/97; G06T 7/55; G06T 7/521; G06T 2207/10028; H04N 13/239; H04N 13/128; H04N 13/271; G06K 9/3233
  See application file for complete search history.

(56) References Cited

U.S. PATENT DOCUMENTS

| | | | |
|---|---|---|---|
| 9,165,211 B2 | 10/2015 | Rhee et al. | |
| 10,250,871 B2 | 4/2019 | Ciurea et al. | |
| 10,360,462 B2 | 7/2019 | Koishi et al. | |
| 10,362,296 B2 | 7/2019 | Price et al. | |
| 10,424,073 B2 | 9/2019 | Karino | |
| 10,708,577 B2 | 7/2020 | Trail | |
| 2002/0080998 A1 | 6/2002 | Matsukawa et al. | |
| 2006/0280360 A1* | 12/2006 | Holub | H04N 17/045 382/162 |
| 2009/0129667 A1 | 5/2009 | Ho et al. | |

(Continued)

OTHER PUBLICATIONS

United States Office Action, U.S. Appl. No. 16/418,510, dated Aug. 31, 2020, 13 pages.

*Primary Examiner* — Ping Y Hsieh
(74) *Attorney, Agent, or Firm* — Fenwick & West LLP

(57) ABSTRACT

A depth estimation system is described capable of determining depth information using two images from two cameras. A first camera captures a first image and a second camera captures a second image, both images including a plurality of light channels. In a first light channel of the plurality of light channels, the system calculates a census transform for each pixel of the first image and a census transform for each pixel of the second image. In a second light channel of the plurality of light channels, the system calculates a census transform for each pixel of the first image and a census transform for each pixel of the second image. The system generates a depth map based in part on the census transforms for each pixel of the first image and the second image in the first light channel and in the second light channel.

20 Claims, 7 Drawing Sheets

(56) References Cited

U.S. PATENT DOCUMENTS

| | | |
|---|---|---|
| 2009/0244263 A1 | 10/2009 | Saito |
| 2010/0142852 A1 | 6/2010 | Fujita et al. |
| 2010/0246896 A1 | 9/2010 | Saito |
| 2011/0285826 A1 | 11/2011 | Bickerstaff et al. |
| 2013/0010073 A1* | 1/2013 | Do .................. H04N 13/214 348/46 |
| 2013/0141575 A1 | 6/2013 | Lee et al. |
| 2013/0169800 A1 | 7/2013 | Mori |
| 2014/0002612 A1 | 1/2014 | Morioka et al. |
| 2014/0003704 A1* | 1/2014 | Liao ..................... G06T 7/593 382/154 |
| 2014/0028804 A1 | 1/2014 | Usuda et al. |
| 2014/0286536 A1 | 9/2014 | Pettersson et al. |
| 2015/0062166 A1 | 3/2015 | Pan et al. |
| 2015/0145963 A1 | 5/2015 | Oshima et al. |
| 2015/0193657 A1 | 7/2015 | Gurman |
| 2015/0193965 A1 | 7/2015 | Chen et al. |
| 2015/0206313 A1 | 7/2015 | Reif et al. |
| 2016/0078798 A1 | 3/2016 | Watanabe et al. |
| 2016/0241774 A1 | 8/2016 | Mochizuki |
| 2016/0304098 A1 | 10/2016 | Ito et al. |
| 2016/0373714 A1 | 12/2016 | Lee et al. |
| 2017/0127048 A1 | 5/2017 | Nobayashi et al. |
| 2017/0180713 A1 | 6/2017 | Trail |
| 2017/0214845 A1 | 7/2017 | Ohara |
| 2017/0244960 A1 | 8/2017 | Ciurea et al. |
| 2018/0061070 A1 | 3/2018 | Higuchi et al. |
| 2018/0165528 A1 | 6/2018 | Koishi et al. |
| 2018/0262744 A1* | 9/2018 | Tadi ..................... H04N 13/239 |
| 2018/0357775 A1 | 12/2018 | Wang et al. |
| 2019/0026921 A1 | 1/2019 | Murayama et al. |
| 2019/0058859 A1* | 2/2019 | Price ..................... H04N 13/111 |
| 2019/0087674 A1 | 3/2019 | Gao et al. |
| 2019/0259163 A1 | 8/2019 | Mao et al. |
| 2020/0193636 A1 | 6/2020 | Yang |
| 2020/0226776 A1* | 7/2020 | Toma ..................... G06T 7/77 |

\* cited by examiner

400

Selecting a scan direction from a plurality of scan directions
410

Along each scanline in the scan direction, comparing pixels from the first image to pixels from the second image by calculating and summing Hamming distances from the census transforms in each light channel
420

Determining a stereo correspondence between the first image and the second image which minimizes the summed Hamming distances
430

Generating a depth map based on the stereo correspondence
440

FIG. 4

MULTI-CHANNEL DEPTH ESTIMATION USING CENSUS TRANSFORMS

CROSS-REFERENCE TO RELATED APPLICATIONS

This application claims benefit of and priority to U.S. Provisional Application Ser. No. 62/674,430, filed on May 21, 2018, which is hereby incorporated by reference in its entirety.

BACKGROUND

This present disclosure generally relates to depth estimation from image data, and more specifically to multi-channel depth estimation using census transforms.

Headsets in an artificial reality system often include or are paired with depth estimation systems that may determine depth information of environments of the artificial reality system. Some conventional manners of determining depth information rely on stereo algorithms that determine a stereo correspondence between two images by considering detected light using only a luminance (luma) channel. However, stereo algorithms based only on a luma channel are limited in situations where that light channel may have low contrast, e.g., in an outdoor environment saturated with light or in a low-light environment.

SUMMARY

The present disclosure relates to a method for determining depth information with a stereo pair of images captured from two cameras on a headset. The method includes capturing a first image at a first camera and a second image at a second camera (e.g., on a headset), the first image and the second image including an environment and in a plurality of light channels (e.g., some combination of red, green, blue, and infrared). The method includes calculating a census transform in at least two light channels of the plurality of light channels for each pixel of the first image and for each pixel of the second image. The method also includes generating a depth map based on a comparison of the census transforms in the at least two light channels between the first image and the second image. Generation of the depth map may be accomplished using stereo algorithms that determine a stereo correspondence between the first image and the second image according to the census transforms in the at least two light channels. A headset in an artificial reality environment implementing the method can generate virtual content to be displayed by an electronic display with the generated depth map.

BRIEF DESCRIPTION OF THE DRAWINGS

FIG. 4 is a flowchart describing a method for performing a stereo algorithm between a pair of images using census transforms in at least two light channels, in accordance with one or more embodiments.

Figure 1:
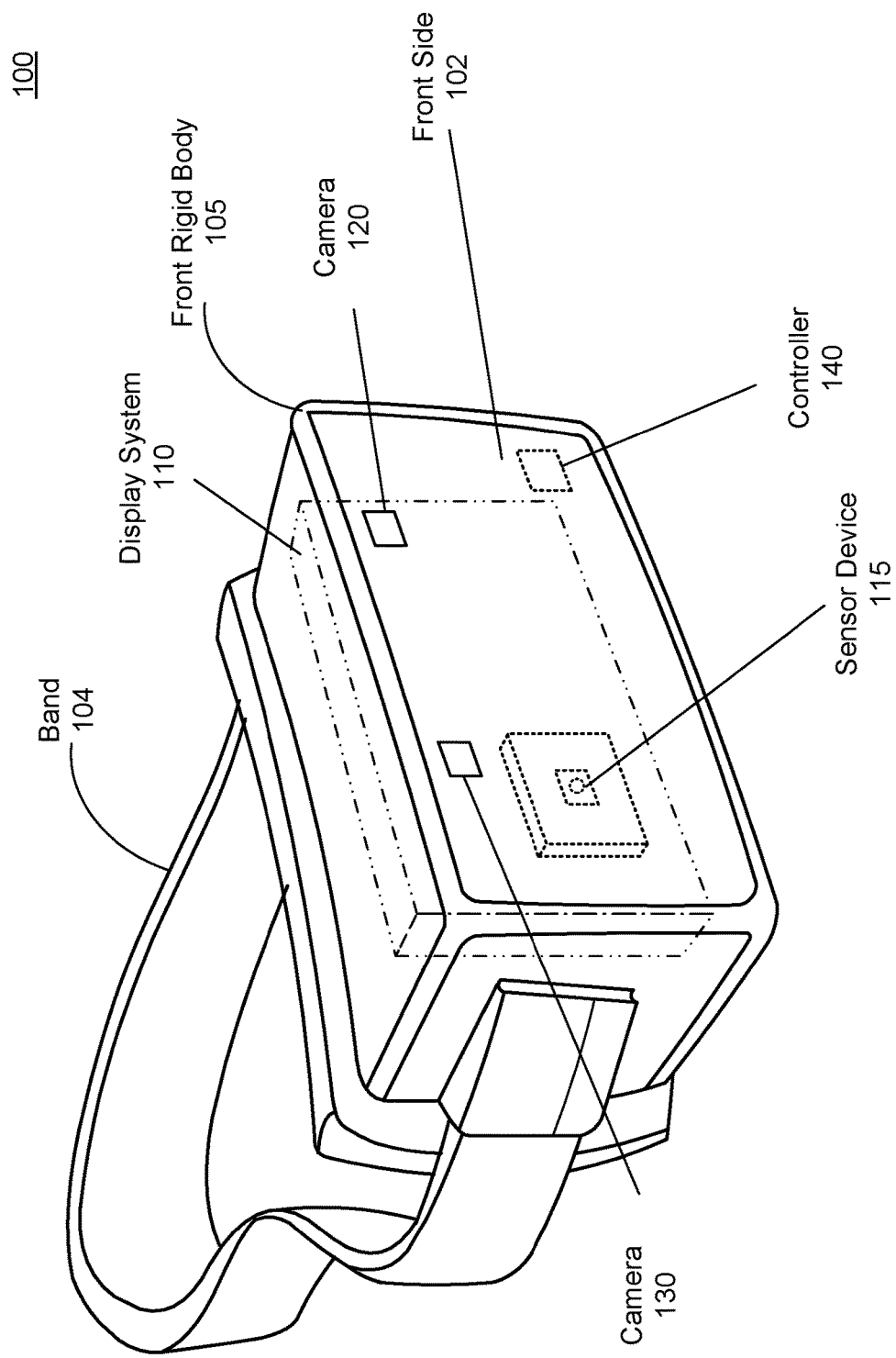
FIG. 1 is a perspective view of a headset, in accordance with one or more embodiments.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

Overview

A headset is configured to provide content to a user of the headset. The headset incorporates a depth estimation system for determining depth information of an environment around the headset, e.g., depth maps of scenes around the headset. The depth estimation system has at least two cameras (e.g., placed on an exterior surface of the headset) and configured to capture images of the environment (e.g., with some degree of overlapping field of views). For depth estimation, the cameras capture images of a scene (also referred to as stereo pairs) in multiple light channels (e.g., one or more color channels such as red, green, blue, an infrared channel, a luma channel which covers substantially the entire visible spectrum, etc.) from their own perspective. In some embodiments, some or all of the cameras may also capture images in a synchronous manner (e.g., at the same time). The digital values of each pixel in a light channel may indicate some intensity of light in that light channel that was detected by the camera. With the stereo pair of images, the depth estimation system calculates a census transform in at least two different light channels for each pixel in each image of the stereo pair. The census transform for a pixel describes relative intensity of neighboring pixels compared to that pixel.

The depth estimation system compares census transforms from the stereo pair to determine a stereo correspondence. The comparison may be accomplished with any number of stereo algorithms including semi-global matching. From the stereo correspondence, the depth estimation system generates a depth map of some portion of the environment in the field of view of the two cameras. When determining the stereo correspondence, using census transforms calculated for two or more different light channels provides more specificity in comparing pixels from two images. In examples where one of the many light channels has low contrast (e.g., the luma channel has low contrast due to an oversaturated sunny environment), the depth estimation system can take advantage of other light channels that may have better contrast (e.g., a blue channel and a red channel have high contrast).

Embodiments of the invention may include or be implemented in conjunction with an artificial reality system. Artificial reality is a form of reality that has been adjusted in some manner before presentation to a user, which may include, e.g., a virtual reality, an augmented reality, a mixed reality, a hybrid reality, or some combination and/or derivatives thereof. Artificial reality content may include completely generated content or generated content combined with captured (e.g., real-world) content. The artificial reality content may include video, audio, haptic sensation, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a handheld device, a headset (e.g., an eyewear device, a head-mounted display (HMD) assembly with the eyewear device as a component, a HMD connected to a host computer system, a standalone HMD), a mobile device or computing system, or any other hardware platform capable of providing artificial reality content to one or more viewers. In addition, the artificial reality system may implement multiple input/output devices for receiving user input which may influence the artificial reality content provided to the user.

Headset

FIG. 1 is a perspective view of a headset 100, in accordance with one or more embodiments. The headset 100 presents content to a user. Examples of content presented by the headset 100 include visual content, audio content, haptic feedback content, artificial reality content, or some combination thereof. The headset 100 may be an eyewear device or a head-mounted display (HMD). The headset 100 includes, among other components, a front rigid body 105, a display system 110, a sensor device 115, a plurality of cameras (e.g., camera 120 and camera 130), and a controller 140. In other embodiments, the headset 100 may include fewer or additional components than those listed herein, such as speakers, haptic feedback devices, light sources, additional cameras, etc. In embodiments using an infrared channel, one or more light sources may be configured to provide infrared light. The projected infrared light may be configured as a structured illumination pattern and/or infrared flashes. The structured illumination patterns are beneficial in depth estimation in that the structured illumination patterns help to highlight spatial texture in a scene. Likewise, various operations described below may be variably distributed among components in the headset 100.

The front rigid body 105 holds the display system 110, the sensor device 115, the plurality of cameras, and the controller 140. The front rigid body 105 couples to a user's face around the user's eyes. The front rigid body 105 has a front side 102 that is an exterior surface of the front rigid body 105 directed away from the user's body when the headset 100 is worn. The front rigid body 105 holds the display system 110 within such that the display system 110 can provide visual content to the user. The front rigid body 105 is attached to a band 104 which can be used to hold the front rigid body 105 to the user's face when the headset 100 is being worn by the user. The band 104 can be constructed by an elastic material providing sufficient force to hold the front rigid body 105 to the user's face.

The display system 110 provides visual content. The display system 110 has, among other components, an electronic display and an optics block. The electronic display generates image light according to visual content rendered to be presented to the user. The optics block directs the image light to an eye-box of the headset 100 where a user's eyes would be located when the headset 100 is properly worn. The display system 110 may additional comprise other optical elements for various purposes, e.g., focusing of light, correcting for aberrations and/or distortions, magnifying light, directing light from an environment, etc. The display system 110 will be discussed in greater detail in FIG. 7.

The sensor device 115 detects movement of the headset 100. The sensor device 115 includes one or more position sensors and an inertial measurement unit (IMU). In some embodiments, the sensor device 115 is embedded into the front rigid body 105 underneath a surface layer rendering the sensor device 115 invisible to a user of the headset 100. The IMU is an electronic device that generates IMU data based on measurement signals received from one or more of the position sensors. A position sensor generates one or more measurement signals in response to motion of the headset 100. Examples of position sensors include: one or more accelerometers, one or more gyroscopes, one or more magnetometers, another suitable type of sensor that detects motion, a type of sensor used for error correction of the IMU, or some combination thereof. The position sensors may be located external to the IMU, internal to the IMU, or some combination thereof. The IMU and the position sensor will be discussed in greater detail in FIG. 7.

The plurality of cameras, including the two cameras 120 and 130, capture images of an environment of the headset 100. The plurality of cameras are placed on an external surface of the headset 100. In the embodiment shown in FIG. 1, the cameras 120 and 130 are placed on the front side 102 of the front rigid body 105. In this embodiment, the cameras 120 and 130 are placed to capture images of an environment in front of the headset 100. The cameras 120 and 130 are placed on a substantially similar plane with fields of view that overlap in part. In some implementations, two or more cameras of the plurality of cameras may have fully overlapping fields of view. The cameras 120 and 130 are capable of capturing images in a plurality of light channels. A light channel describes a brightness as an intensity value corresponding to an amount of light detected in one or more portions of the electromagnetic spectrum which can be a specific wavelength or a range of wavelengths. For example, a red channel is a light channel covering a portion of the electromagnetic spectrum that includes red light, e.g., 675 nm or a range from 630 nm to 700 nm. As another example, a luma channel is a light channel covering portions of the electromagnetic spectrum for red light, green light, and blue light, such that an intensity value in the luma channel describes a brightness, i.e., an amount of light detected in the red light, the green light, and the blue light. The plurality of light channels may include one or more color channels (e.g., red, green, blue, etc.), one or more infrared channels, one or more ultraviolet channels, one or more luma channels, one or more other portions of the electromagnetic spectrum, or any combination thereof. The cameras 120 and 130 comprise at least a camera sensor capable of detecting light but may also include any optical element for focusing the light and such. In some embodiments, the camera sensor provides image data comprising intensity values at each pixel of light detected in each of the plurality of light channels. In other embodiments, the camera sensor provides image data comprising census transforms for each pixel. The cameras 120 and 130 can be synchronized to capture images at the same time, thereby capturing stereo pairs of images. In other embodiments, the headset 100 may include additional cameras located anywhere around the front rigid body 105, e.g., for capturing images all around the headset 100. The cameras 120 and 130 and the camera sensor is described in greater detail in FIGS. 4 and 5.

The controller 140 determines depth information with images captured by some or all of the plurality of cameras. The controller 140 obtains the image data from the cameras.

With two cameras, e.g., the cameras 120 and 130, the image data may be grouped into stereo pairs. The controller 140 compares the census transforms in two or more distinct light channels (e.g., red and green) between a stereo pair to determine a stereo correspondence for the stereo pair. The stereo correspondence relates one or more pixels of the first image to one or more pixels of the second image. For example, pixels showing an object in the first image are related to pixels showing the object in the second image. Comparing the census transforms may be accomplished with any variety of stereo algorithms including global patch matching, semi-global matching, machine learning algorithms, etc. Semi-global matching will be further described below in conjunction with FIGS. 3-4. The controller 140 determines the depth map using the stereo correspondence for the stereo pair. Stereo algorithms used to compare census transforms for determining depth information will be further described in FIGS. 2-4.

In additional embodiments, the controller 140 provides instructions to other components of the headset 100. In relation to the display system 110, the controller 140 generates instructions for presentation of visual content by the display system 110. In embodiments with an audio system as a component of the headset 100, the controller 140 may generate instructions for presentation of audio content to the audio system. Similarly, with a haptic feedback device, the controller 140 may generate instructions for generation and provision of haptic feedback content. And with any other component of the headset 100, the controller 140 may manage operation of such components.

Figure 2:
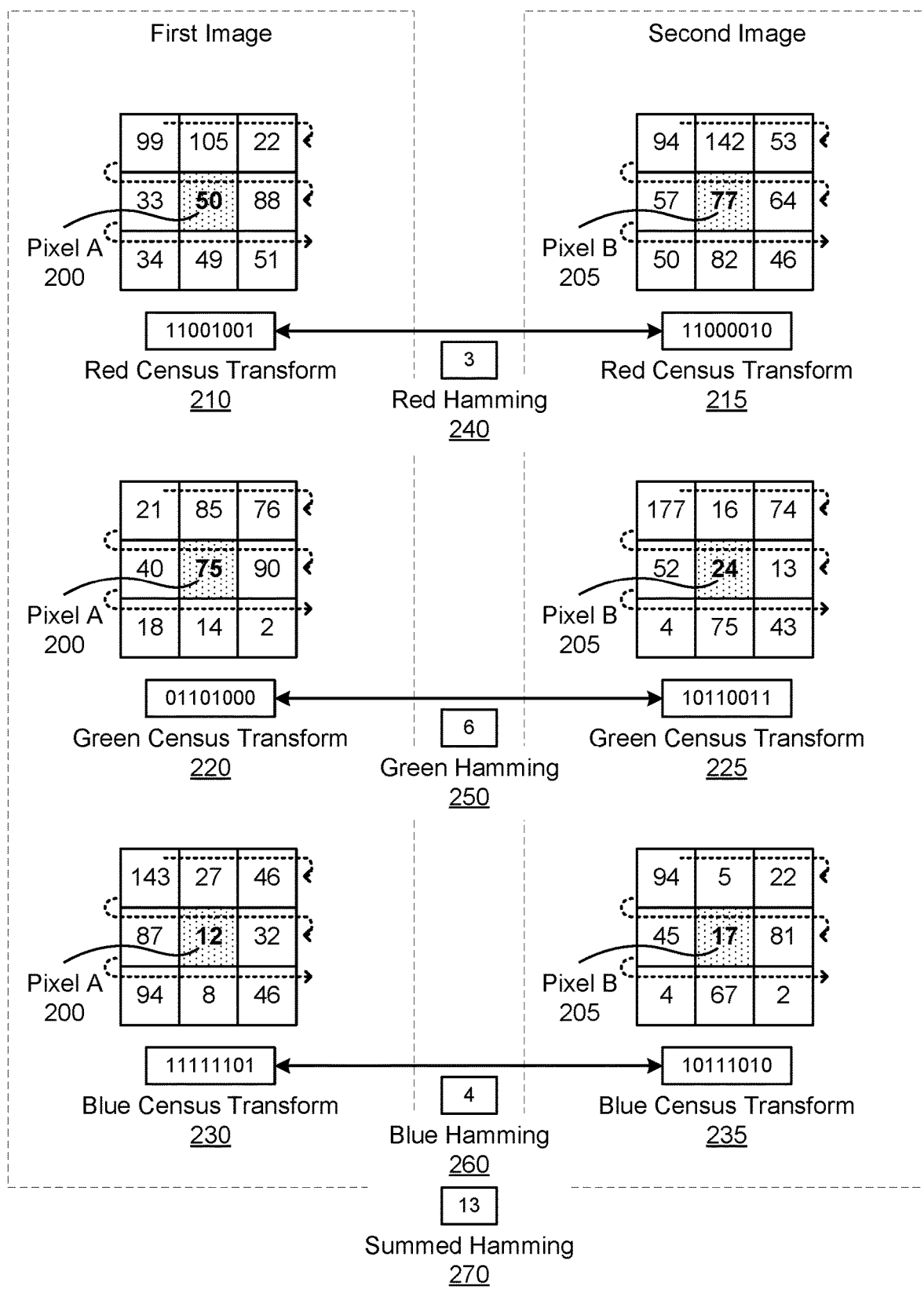
FIG. 2 is an illustration of comparing census transforms in a plurality of light channels between a pixel in a first image and a pixel in a second image, in accordance with one or more embodiments.

FIG. 2 is an illustration of comparing census transforms in a plurality of light channels between a pixel in a first image and a pixel in a second image, in accordance with one or more embodiments. Pixel A 200 and its neighboring pixels are from a first image captured by a first camera (e.g., the camera 120) and pixel B 205 and its neighboring pixels are from a second image captured by a second camera (e.g., the camera 130). Pixel A 200 and pixel B 205 comprises their own respective values in a red channel, a green channel, and a blue channel.

The census transform for a pixel is defined as an n-bit string of binary values calculated based on whether neighboring pixels have intensity values that are greater than the given pixel. For example, if a neighboring pixel has an intensity value greater than the given pixel, then the binary value is 1; and if the neighboring pixel has an intensity value does not have an intensity value greater than the given pixel, then the binary value is 0. Neighboring pixels refers to pixels in a b×c pixel grid around the pixel in consideration resulting in an n-bit string, wherein n=b×c−1. The grid typically is centered around the given pixel. In the example of FIG. 2, census transforms are calculated in a 3×3 grid considering the neighboring pixels in the 3×3 grid from a top left corner of the grid down rows of the neighboring pixels. With pixels around the edge of the image, the n-bit string can include bit values of 0 for non-existent neighboring pixels. The order of the binary values in the n-bit string can differ depending on the order the neighboring pixels are considered. For example, the neighboring pixels may be considered from a top left corner of the grid moving down the rows. In another example, the neighboring pixels may be considered from a bottom right corner of the grid moving up the columns. With multiple light channels, a census transform can be calculated in each light channel for the center pixel. For example, all pixels of an image may be comprised of an intensity value in each of three light channels. A census transform for one of the three light channels is calculated using intensity values of the pixels in that light channel and similarly for the remaining two light channels.

To compare two pixels from two images, a census transform is calculated in two or more distinct light channels for both pixels. More specifically when considering two distinct light channels, a first census transform is calculated for the first pixel and a second census transform for the second pixel for a first light channel; and a third census transform for the first pixel and a fourth census transform for the second pixel for the second light channel. In embodiments consider additional light channels more than two, census transforms for each pixel are additionally calculated for the remaining light channels in consideration.

As exampled in FIG. 2, first considering pixel A 200, a census transform can be calculated for each of the light channels. In the red channel, a census transform is calculated by comparing neighboring pixels with intensity values in the red channel of 99, 105, 22, 33, 88, 34, 49, and 51 to pixel A 200 with intensity value of 50 which results in a red census transform 210 of <11001001>. Similarly with the green channel, a green census transform 220 of <01101000> is calculated based on neighboring pixels having intensity values in the green channel of 21, 85, 76, 40, 90, 18, 14, and 2 compared to the intensity value in the green channel for pixel A 200 of 75. Similarly with the blue channel, a blue census transform 230 of <11111101> is calculated based on neighboring pixels having intensity values in the blue channel of 143, 27, 46, 87, 32, 94, 8, and 46 compared to the intensity value in the blue channel for pixel A 200 of 12.

Next, considering pixel B 205, a census transform can be calculated in each light channel. In the red channel, a census transform is calculated by comparing neighboring pixels with intensity values in the red channel of 94, 142, 53, 57, 64, 50, 82, and 46 to pixel B 205 with intensity value in the red channel of 77 which results in a red census transform 215 of <11000010>. Similarly with the green channel, a green census transform 225 of <10110011> is calculated based on neighboring pixels having intensity values in the green channel of 177, 16, 74, 52, 13, 4, 75, and 43 compared to the intensity value in the green channel for pixel B 205 of 24. Similarly with the blue channel, a blue census transform 235 of <10111010> is calculated based on neighboring pixels having intensity values in the blue channel of 94, 5, 22, 45, 81, 4, 67, and 2 compared to the intensity value in the blue channel for pixel B 205 of 17.

Hamming distances are calculated using at least some of the calculated census transforms. Between the census transforms in each light channel (e.g., in a red channel, in a luma channel, in another light channel, etc.), a Hamming distance is calculated based on a count of different values in the census transform in the corresponding light channel. For example, a Hamming distance of five is determined if five bits (or five values) between two census transforms are different. In the red channel, a red Hamming distance 240 of 3 is calculated as there are 3 bits (underlined) that differ between the red census transform 210 for pixel A 200 <1100 1001> and the red census transform 215 for pixel B 205 <11000010>. In the green channel, a green Hamming distance 250 of 6 is calculated as there are 6 bits (underlined) that differ between the green census transform 220 for pixel A 200 <01101000> and the green census transform 225 for pixel B 205 <10110011>. In the blue channel, a blue Hamming distance 260 of 4 is calculated as there are 4 bits (underlined) that differ between the blue census transform 230 for pixel A 200 <11111101> and the blue census transform 235 for pixel B 205 <10111010>.

A summed Hamming distance combines two or more Hamming distances calculated from two or more distinct light channels. For example, if a red channel and an infrared channel are considered, comparing two pixels would use a summed Hamming distance that summed a red Hamming distance and a green Hamming distance. In the example of FIG. 2, a summed Hamming distance 270 of 13 is calculated as a sum of the red Hamming distance 250, the green Hamming distance 260, and the blue Hamming distance 270. In embodiments where red, green, and blue channels are considered in the stereo algorithms, the summed Hamming distance 270 is used as the primary metric for comparing pixels. In other embodiments, a subset of the captured channels are considered, resulting in a sum of the Hamming distances calculated for the subset of channels. A depth estimation system can utilize the summed Hamming distance 270 as a metric for determining a stereo correspondence between the first image and the second image.

Figure 3:
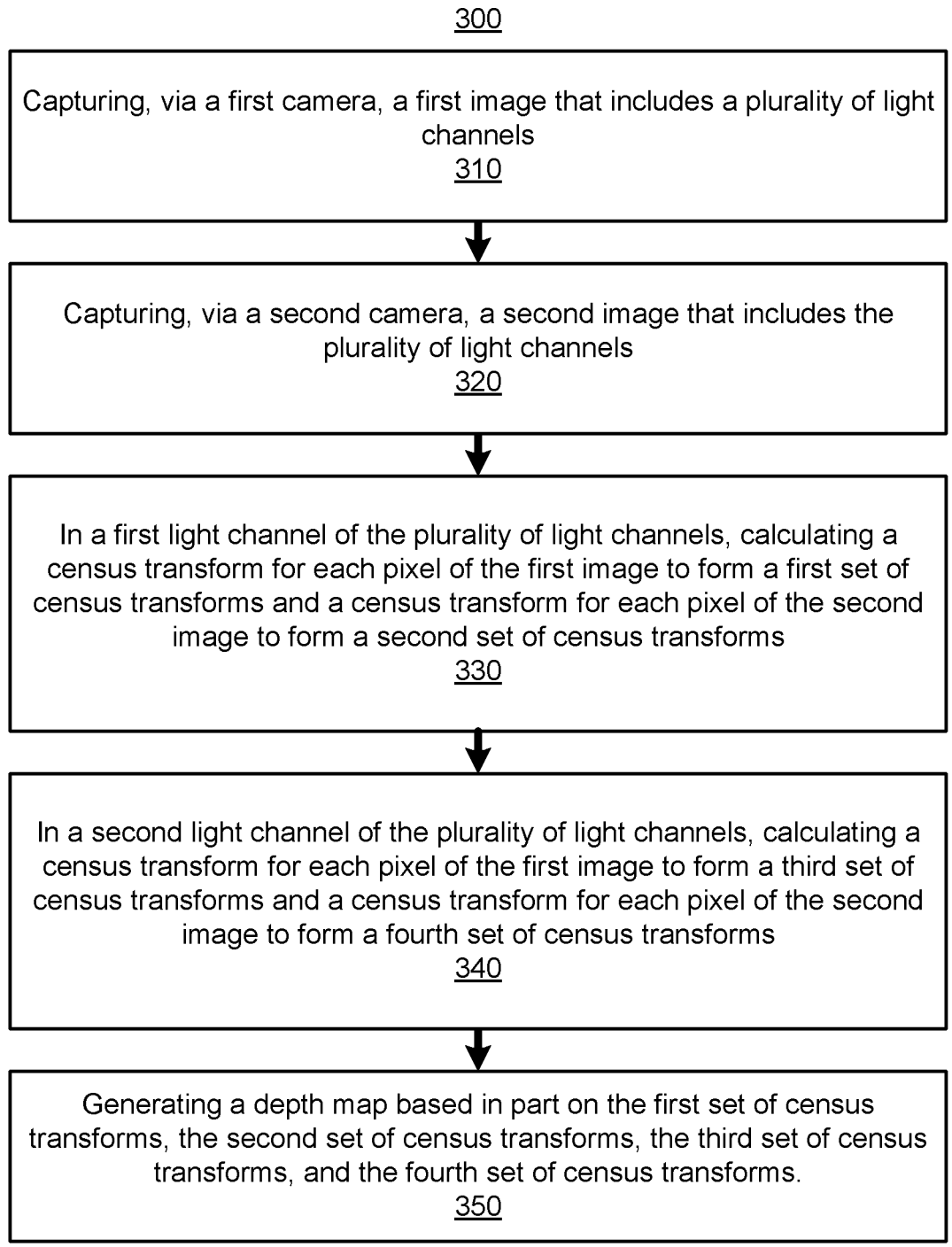
FIG. 3 is a flowchart describing a method of multi-channel depth estimation, in accordance with one or more embodiments.

FIG. 3 is a flowchart describing a method 300 of multi-channel depth estimation, in accordance with one or more embodiments. The method may be accomplished by a depth estimation system, e.g., of the headset 100. Other entities may perform some or all of the steps of the process in other embodiments. Likewise, embodiments may include different and/or additional steps, or perform the steps in different orders.

The depth estimation system captures 310, via a first camera, a first image that includes a plurality of light channels. The plurality of light channels may include one or more color channels, an infrared channel, a luma channel, another portion of the electromagnetic spectrum, or any combination thereof. In one example, the plurality of light channels include a red channel, a green channel, a blue channel, and an infrared channel. In each light channel, the pixels of the first image have an intensity value for light detected in that light channel.

The depth estimation system captures 320, via a second camera, a second image that includes the plurality of light channels. The second camera and the first camera may capture the first image and the second image in synchronicity or at relatively close times. The first image and the second image include a scene of an environment with some degree of overlap in fields of view. If the fields of view do not overlap, the first image and the second image would not have any features that can be used to determine a stereo correspondence between the first image and the second image.

In some embodiments, the depth estimation system calculates a contrast in each of the light channels and selects two or more of the light channels with higher contrasts for use in determining the stereo correspondence. The contrast may be calculated as a standard deviation of the intensity values. For example, the depth estimation system calculates that the red channel and blue channel have the highest two contrasts of the plurality of light channels. The depth estimation may select the red channel and the blue channel for use in determining stereo correspondence.

The depth estimation system, in a first light channel of the plurality of light channels, calculates 330 a census transform for each pixel of the first image to form a first set of census transforms and a census transform for each pixel of the second image to form a second set of census transforms. The census transform for each pixel is an n-bit string wherein each bit corresponds to whether a neighboring pixel to the given pixel has an intensity value greater than the intensity value of the given pixel. The census transforms may be determined by a controller of the depth estimation system while using intensity values detected by the first camera and the second camera. Alternatively the first camera and the second camera determine the census transforms for the first image and the second image during read out of intensity values captured by the camera sensors, respectively.

The depth estimation system, in a second light channel of the plurality of light channels, calculates 340 a census transform for each pixel of the first image to form a third set of census transforms and a census transform for each pixel of the second image to form a fourth set of census transforms. Similar to step 330, the census transforms may be determined by a controller of the depth estimation system while using intensity values detected by the first camera and the second camera. Alternatively the first camera and the second camera determine the census transforms for the first image and the second image during read out of intensity values captured by the camera sensors, respectively. The census transforms (e.g., from steps 330 and 340) are used for comparing pixels for the purpose of determining a stereo correspondence between the first image and the second image.

The depth estimation system generates 350 a depth map based in part on the first set of census transforms, the second set of census transforms, the third set of census transforms, and the fourth set of census transforms. The depth estimation system utilizes a stereo algorithm using the sets of census transforms for the two images to determine a stereo correspondence between the images. With the stereo correspondence, the depth estimation system generates a depth map. The depth map may be from a perspective of one of the two cameras or may alternatively be from a different perspective synthesized from the two perspectives of the two cameras. Each pixel in the depth map has a depth value for each pixel indicating a relative distance of a surface in the environment.

With the depth map, the depth estimation system may generate content based on the depth map. For example, in an augmented reality environment, one or more of the images captured by the cameras may be displayed on a display, e.g., via the display system 110 of FIG. 1 in the headset 100. The images may be augmented with virtual content that is generated based on the depth map. In one application, a virtual character is shown in the display able to interact with the environment. In one instance, the virtual character moves about the scene seamlessly, e.g., adjusting size as the virtual character is moving towards or away from the user and/or the virtual character can duck behind another object where a portion of the virtual character is then occluded by the object. When implemented in the context of a virtual reality system, the depth map may be used to inform a headset of objects in the environment, e.g., for collision avoidance.

FIG. 4 is a flowchart describing a method 400 for performing a stereo algorithm between a pair of images using census transforms in at least two light channels, in accordance with one or more embodiments. The method 400 is a semi-global matching algorithm which may be implemented as part of step 350 in the method 300. The method may be accomplished by a depth estimation system, e.g., of the headset 100. Other entities may perform some or all of the steps of the process in other embodiments. Likewise, embodiments may include different and/or additional steps, or perform the steps in different orders.

The depth estimation system selects 410 a scan direction from a plurality of scan directions. The plurality of scan directions are selected from different angles. For example, one scan direction can be horizontal (0° from horizontal), another scan direction can be vertical (90° from horizontal), and yet another scan direction can be diagonal (45° from horizontal), etc. From the plurality of scan directions, the depth estimation system compares pixels along scanlines in each of the scan directions. The depth estimation system may then determine the stereo correspondence considering the comparisons in the scan directions. Comparing pixels along different scan directions is advantageous in that considering multiple scan directions better identifies edges of features shown in the images.

Along each scanline in the scan direction, the depth estimation system compares 420 pixels from the first image to pixels from the second image by calculating and summing Hamming distances from the census transforms in two or more distinct light channels. Given a scan direction, the images can be divided up into parallel scanlines covering all pixels in the images. Calculating and summing Hamming distances can be accomplished according to principles described above in FIG. 2. Along a scanline, a matrix may be generated using the summed census transforms showing the cost of each pixel (in an x-direction of the matrix) versus the possible disparity value (in a y-direction of the matrix). The solution for the depth disparity minimizes the costs. Linear programming can be used to identify the solution that minimizes the costs. Depth disparities in each scanline is accumulated into a disparity map for the scan direction. The depth estimation system determines a disparity map for each of the remaining scan directions.

The depth estimation system determines 430 a stereo correspondence between the first image and the second image which minimizes the summed Hamming distances. With the depth maps for all the scan directions, the depth estimation system determines the stereo correspondence that minimizes the costs between the depth maps in the scan directions. The stereo correspondence relates pixels from the first image to pixels from the second image.

The depth estimation system generates 440 a depth map based on the stereo correspondence. The depth estimation system calculates depth values for pixels in the depth map according to the stereo correspondence. Objects in a similar location in the first image and the second image may be determined to be relatively far away from the cameras, whereas objects that are substantially displaced between the first image and the second image may be determined to relatively close to the cameras. Generating the depth map based on the stereo correspondence may be accomplished with linear programming as well.

Figure 5:
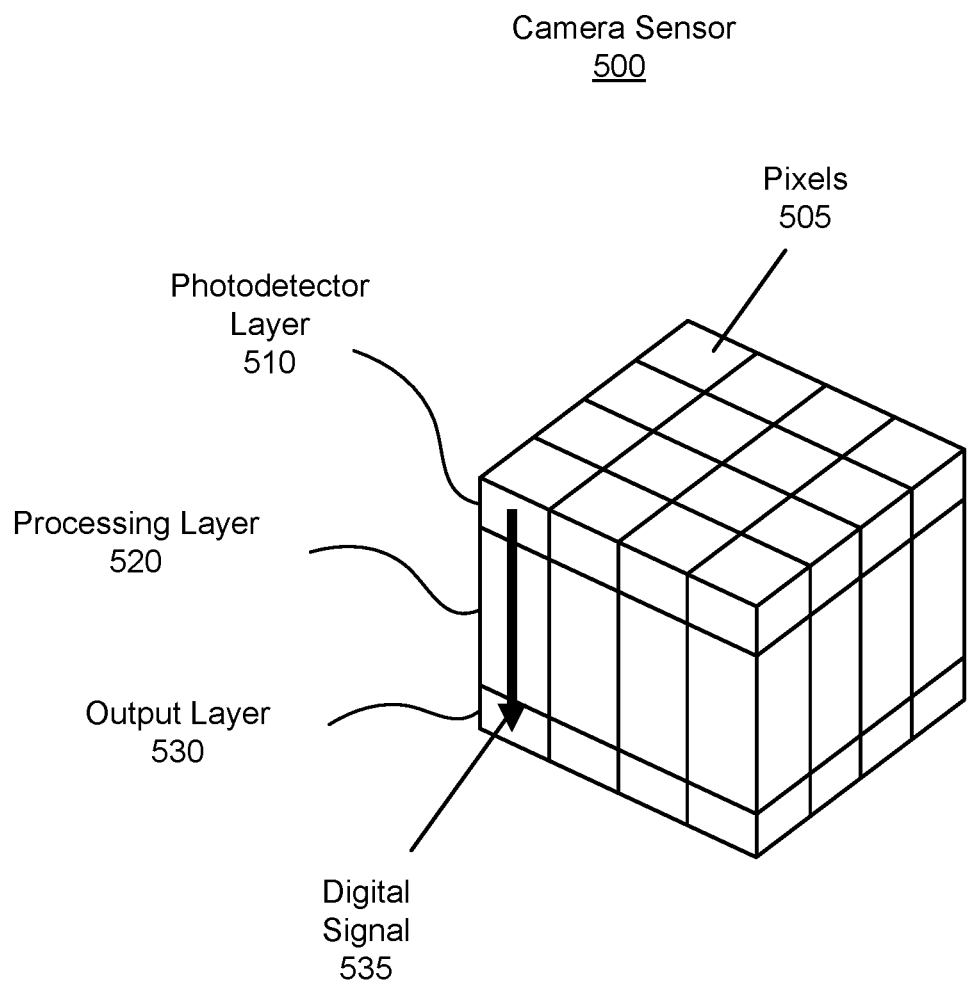
FIG. 5 is a perspective view of a stacked camera sensor, in accordance with one or more embodiments.

FIG. 5 is a perspective view of a stacked camera sensor 500, in accordance with one or more embodiments. The stacked camera sensor 500 can be implemented into the cameras used in depth estimation, e.g., the camera 120 and the camera 130. The stacked camera sensor 500 detects light and converts the light into a digital signal, e.g., for use in depth estimation. The stacked camera sensor 500 includes a photodetector layer 510, a processing layer 520, and an output layer 530. In other embodiments, the stacked camera sensor 500 may include fewer or additional components than those listed herein. Likewise, various operations described below may be variably distributed among components in the stacked camera sensor 500.

The photodetector layer 510 receives light. The photodetector layer 510 comprises a plurality of pixels 505, e.g., arranged in a grid. Each pixel is a photodiode capable of receiving light energy and storing an electric potential as pixel data, the pixel data based on the amount of light energy received. Each pixel can be configured with sub-pixels that can each detect light in a specific light channel defined by a specific wavelength of light or range of wavelengths. For example, a pixel has a first sub-pixel to detect light in a red channel, a second sub-pixel to detect light in a green channel, a third sub-pixel to detect light in a blue channel, a fourth sub-pixel to detect light in an infrared channel. In other embodiments, one or more filters may be placed before the photodetector layer 510, e.g., to create the sub-pixels. For example, a filter may be patterned to filter out varying portions of the electromagnetic spectrum at varying locations. A Bayer filter is one example where a pattern of red filters, green filters, and blue filters allow to pass red light, green light, and blue light, respectively.

The processing layer 520 converts the pixel data into a digital signal. The processing layer 520 comprises circuitry to convert the pixel data in the photodetector layer 510 into a digital signal. In some embodiments, the processing layer 520 converts the pixel data into the digital signal as intensity values corresponding to the electric potential stored in the photodetector layer. For example, with sub-pixels in the red channel, green channel, and blue channel, the processing layer 520 may convert the pixel data into intensity values for red, green, and blue (also referred to as RGB values). Optionally, the digital signal may also include an intensity value for the infrared channel. In other embodiments, the processing layer 520 converts the pixel data into the digital signal as census transforms in two or more of the light channels. In one implementation, the processing layer 520 may have integrated circuit logic to compare stored electric potentials between neighboring pixels and a pixel to determine a census transform for that pixel in a given light channel. In another implementation, the processing layer 520 may determine the census transform via computer logic.

The output layer 530 outputs the digital signal, e.g., to a controller for use in depth estimation. The digital signal may include the intensity values for each of the light channels detected by the photodetector layer 510. The digital signal may either or also include census transforms for each pixel in each of the light channels.

Figure 6:
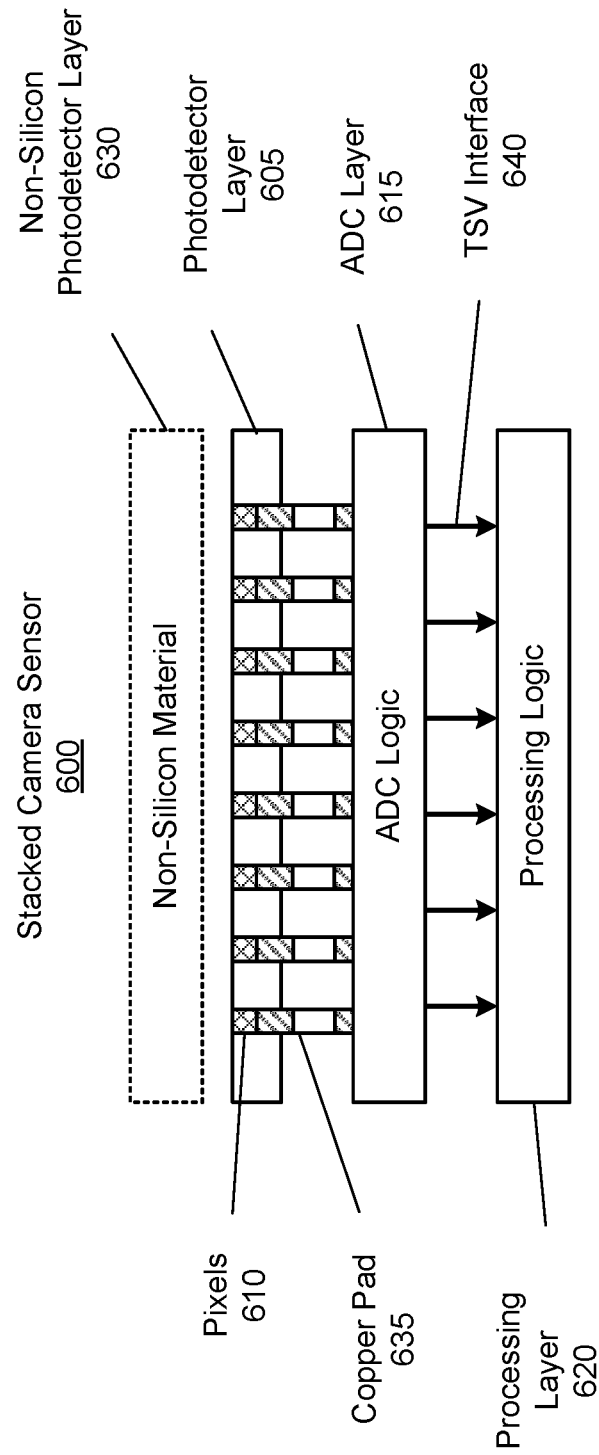
FIG. 6 is a cross-sectional view of a camera with a plurality of stacked layers, in accordance with one or more embodiments.

FIG. 6 is a cross-sectional view of a stacked camera sensor 600 with a plurality of stacked layers, in accordance with one or more embodiments. The stacked camera sensor 600 may be an embodiment of the stacked camera sensor 500 in FIG. 5. In some embodiments, a photodetector layer 605 may be positioned on top of the stacked camera sensor 600 and may comprise an array of pixels 610, e.g., a two-dimensional array of photodiodes. As processing circuitry of the stacked camera sensor 600 can be integrated into other layers beneath the photodetector layer 605, the photodetector layer 605 can be customized only for photodetection. Thus, an area of the photodetector layer 605 can be relatively small and the photodetector layer 605 may dissipate a limited amount of power. In some embodiments, an analog-to-digital conversion (ADC) layer 615 customized for conversion of analog signals (e.g., intensities of light captured by the photodetector layer 605) into digital data may be placed immediately beneath the photodetector layer 605. The ADC layer 615 may be configured to convert (e.g., by its processing circuitry or ADC logic, details not shown in FIG. 6) analog values of light intensities captured by the pixels 610 of the photodetector layer 605 into digital values corresponding to, e.g., image frame data. The ADC layer 615 may also include a memory (not shown in FIG. 6) for storing the digital values obtained after the conversion.

In some embodiments, a processing layer 620 with processing circuitry customized for determining census transforms may be placed immediately beneath the ADC layer 615. The processing layer 620 may also include a memory for storing, e.g., digital sensor data generated by the ADC layer 615. The processing layer 620 may be configured to determine census transforms from the digital sensor data obtained from the ADC layer 615. The processing layer 620 may be efficiently designed to occupy a small area size and dissipate a limited amount of power. The processing layer 620 may process the pixel data to determine the census transforms for each pixel in each of the light channels. In other embodiments, the processing layer 620 determines the contrast for each light channel and selects two or more light channels. With the selected light channels, the processing layer 620 calculates the census transform for the pixels in each of the selected light channels. The processing layer 620 provides the census transforms as the image data to another processor (e.g., the controller 140) for determining depth information.

In some embodiments, each sensor layer 605, 615, and 620 in the stacked camera sensor 600 customized for a particular processing task can be implemented using silicon-based technology. Alternatively, at least one of the sensor layers 605, 615, and 620 may be implemented based on a non-silicon photo-detection material, e.g., OPF photo-detection material and/or QD photo-detection material. In some embodiments, instead of the silicon-based photodetector layer 605 that includes the array of pixels 610 based on photodiodes, a non-silicon photodetector layer 630 can be placed on top of the stacked camera sensor 600. In one embodiment, the non-silicon photodetector layer 630 is implemented as a photodetector layer of QD photo-detection material, and can be referred to as a QD photodetector layer. In other embodiment, the non-silicon photodetector layer 630 is implemented as a photodetector layer of OPF photo-detection material, and can be referred to as an OPF photodetector layer. In yet other embodiment, more than one photodetector layer can be used for photo detection in the stacked camera sensor 600, e.g., at least one silicon-based photodetector layer 605 and at least one non-silicon based photodetector layer 630.

In some embodiments, a direct copper bonding can be used for inter-layer coupling between the photodetector layer 605 and the ADC layer 615. As shown in FIG. 6, a copper pad 635 may be used as an interface between a pixel 310 in the photodetector layer 605 and processing circuitry (ADC logic) of the ADC layer 615. For example, in the case of photodetector layer 605 implemented as a 20M-pixel camera, up to approximately 20 Mega copper pad connections 635 may be implemented between the photodetector layer 605 and the processing circuitry of the ADC layer 615. Note that a pitch of the photodetector layer 605 can be relatively small, e.g., between approximately 1 µm and 2 µm.

In some embodiments, as discussed, interconnection between sensor layers located in the stacked camera sensor 600 beneath the photodetector layer 605 can be achieved using, e.g., TSV technology. As shown in FIG. 6, a TSV interface 640 may interconnect the ADC logic/memory of the ADC layer 615 with the processing logic of the processing layer 620. The TSV interface 640 may provide digital sensor data obtained by the ADC layer 615 to the processing layer 620 for determining of census transforms, wherein the digital sensor data can be related to image data captured by the photodetector layer 605.

Artificial Reality System Environment

Figure 7:
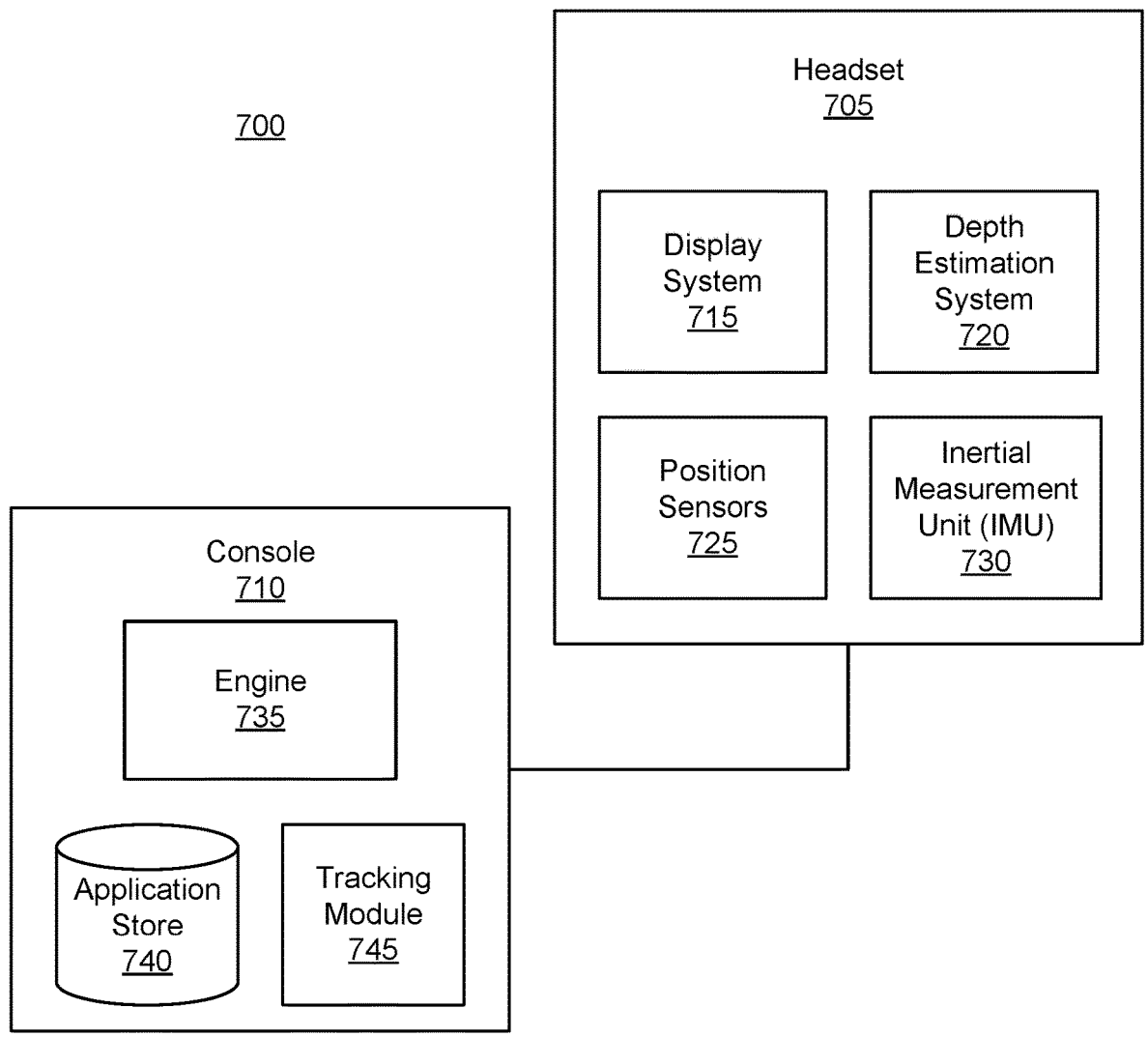
FIG. 7 is a system environment of an artificial reality system including a headset, in accordance with one or more embodiments.

FIG. 7 is a system environment of an artificial reality system 700 including a headset, in accordance with one or more embodiments. The system 700 may operate in an artificial reality context, e.g., a virtual reality, an augmented reality, a mixed reality context, or some combination thereof. The system 700 shown by FIG. 7 comprises a headset 705 and may additionally include other input/output (I/O) devices (not shown) that may be coupled to a console 710. The headset 100 is one embodiment of the headset 705. While FIG. 7 shows an example system 700 including one headset 705, in other embodiments, any number of additional components may be included in the system 700. In alternative configurations, different and/or additional components may be included in the system 700. Additionally, functionality described in conjunction with one or more of the components shown in FIG. 7 may be distributed among the components in a different manner than described in conjunction with FIG. 7 in some embodiments. For example, some or all of the functionality of the console 710 may be integrated into the headset 705.

The headset 705 presents content to a user comprising virtual content. The headset 705 may be an eyewear device, a head-mounted display, an earbud, a headphone, or another type of device placed on a head. In some embodiments, the presented content includes visual content via a display system 715, audio presented through one or more speakers (not shown in FIG. 7), haptic feedback from one or more haptic feedback devices (not shown in FIG. 7), etc. In some embodiments, the headset 705 presents virtual content to the user that is based in part on depth information of a real local area surrounding the headset 705. For example, the user wearing the headset 705 may be physically in a room, and virtual walls and a virtual floor corresponding to walls and floor in the room are rendered as part of the virtual content presented by the headset 705. In another example, a virtual character or a virtual scene may be rendered as an augmentation to views of the real world through the headset 705.

The headset 705 includes a depth estimation system 720. The depth estimation system 720 determines depth information of an environment around the headset 705. The depth information may include a depth map of the environment at an instant of time. The depth estimation system 720 comprises at least two cameras, e.g., the cameras 120 and 130, and a controller, e.g., the controller 140. The cameras capture images of the environment with some overlapping field of view in a plurality of light channels. The plurality of light channels may include two or more color channels, an infrared channel, other light channels, or any combination thereof. With the captured images, the depth estimation system 720 calculates a census transform for each pixel of the captured images in at least two of the light channels. The at least two light channels may be selected among the whole set of light channels based on a contrast value for each of the light channels. The census transforms are used by the controller of the depth estimation system 720 to perform a stereo algorithm to determine a stereo correspondence between a pair of images taken from the cameras. With the stereo correspondence, the controller determines a depth map of the environment, wherein each pixel of the depth map has a depth value describing the relative distance of a surface at that pixel. In other embodiments, the depth estimation system 720 assesses other data received by other components of the headset 705 to determine depth information, e.g., movement. For example, the headset 705 may include proximity sensors that can be also be used alone or in conjunction with the captured images to determine depth information. The depth information determined by the depth estimation system 720 may be used to improve content presented by the headset 705.

The headset 705 also includes the display system 715, position sensors 725, and an inertial measurement Unit (IMU) 730. Some embodiments of the headset 705 have different components than those described in conjunction with FIG. 7. Additionally, the functionality provided by various components described in conjunction with FIG. 7 may be differently distributed among the components of the headset 705 in other embodiments, or be captured in separate assemblies remote from the headset 705. In one or more examples, the headset 705 includes an eye-tracking system, a haptic feedback system, one or more speakers, one or more light sources (e.g., for structured illumination light), etc.

The display system 715 presents visual content to a user of the headset 705. The visual content presented may take into account depth information determined by the depth estimation system 720. The display system 110 is an embodiment of the display system 715. The display system 715 may comprise an electronic display and an optics block. The electronic display displays 2D or 3D images to the user in accordance with data received from the console 710. In various embodiments, the electronic display comprises a single electronic display or multiple electronic displays (e.g., a display for each eye of a user). Examples of the electronic display include: a liquid crystal display (LCD), an organic light emitting diode (OLED) display, an active-matrix organic light-emitting diode display (AMOLED), a waveguide display, some other display, or some combination thereof.

The optics block magnifies image light received from the electronic display, corrects optical errors associated with the image light, and presents the corrected image light to a user of the headset 705. In various embodiments, the optics block includes one or more optical elements. Example optical elements included in the optics block include: a waveguide, an aperture, a Fresnel lens, a convex lens, a concave lens, a filter, a reflecting surface, or any other suitable optical element that affects image light. Moreover, the optics block may include combinations of different optical elements. In some embodiments, one or more of the optical elements in the optics block may have one or more coatings, such as partially reflective or anti-reflective coatings.

Magnification and focusing of the image light by the optics block allows the electronic display to be physically smaller, weigh less, and consume less power than larger displays. Additionally, magnification may increase the field of view of the content presented by the electronic display. For example, the field of view of the displayed content is such that the displayed content is presented using almost all (e.g., approximately 110 degrees diagonal), and in some cases, all of the user's field of view. Additionally, in some embodiments, the amount of magnification may be adjusted by adding or removing optical elements.

In some embodiments, the optics block may be designed to correct one or more types of optical error. Examples of optical error include barrel or pincushion distortion, longitudinal chromatic aberrations, or transverse chromatic aberrations. Other types of optical errors may further include spherical aberrations, chromatic aberrations, or errors due to the lens field curvature, astigmatisms, or any other type of optical error. In some embodiments, content provided to the electronic display for display is pre-distorted, and the optics block corrects the distortion when it receives image light from the electronic display generated based on the content.

The IMU 730 is an electronic device that generates data indicating a position of the headset 705 based on measurement signals received from one or more of the position sensors 725. A position sensor 730 generates one or more measurement signals in response to motion of the headset 705. Examples of position sensors 725 include: one or more accelerometers, one or more gyroscopes, one or more magnetometers, another suitable type of sensor that detects motion, a type of sensor used for error correction of the IMU 730, or some combination thereof. The position sensors 725 may be located external to the IMU 730, internal to the IMU 730, or some combination thereof.

Based on the one or more measurement signals from one or more position sensors 725, the IMU 730 generates head-tracking data indicating an estimated current position of the headset 705 relative to an initial position of the headset 705. For example, the position sensors 725 include multiple accelerometers to measure translational motion (forward/back, up/down, left/right) and multiple gyroscopes to measure rotational motion (e.g., pitch, yaw, and roll). In some embodiments, the IMU 730 rapidly samples the measurement signals and calculates the estimated current position of the headset 705 from the sampled data. For example, the IMU 730 integrates the measurement signals received from the accelerometers over time to estimate a velocity vector and integrates the velocity vector over time to determine an estimated current position of a reference point on the headset 705. Alternatively, the IMU 730 provides the sampled measurement signals to the console 710, which interprets the head-tracking data to reduce error. The reference point is a point that may be used to describe the position of the headset 705. The reference point may generally be defined as a point in space or a position related to the headset's 505 orientation and position.

The console 710 provides content to the headset 705 for processing in accordance with information received from the headset 705. In the example shown in FIG. 7, the console 710 includes an application store 740, a tracking module 745, and an engine 735. Some embodiments of the console 710 have different modules or components than those described in conjunction with FIG. 7. Similarly, the functions further described below may be distributed among components of the console 710 in a different manner than described in conjunction with FIG. 7.

The application store 740 stores one or more applications for execution by the console 710. An application is a group of instructions that, when executed by a processor, generates content for presentation to the user. Content generated by an application may be in response to inputs received from the user via movement of the headset 705 or the I/O interface 515. Examples of applications include: gaming applications, conferencing applications, video playback applications, or other suitable applications.

The tracking module 745 calibrates the system environment using one or more calibration parameters and may adjust one or more calibration parameters to reduce error in determination of the position of the headset 705. Calibration performed by the tracking module 745 also accounts for information received from the IMU 730 in the headset 705. Additionally, if tracking of the headset 705 is lost, the tracking module 745 may re-calibrate some or all of the system environment.

The tracking module 745 tracks movements of the headset 705 as head-tracking data using information from the one or more position sensors 725, the IMU 730, or some combination thereof. For example, the tracking module 745 determines a position of a reference point of the headset 705 in a mapping of a local area based on information from the headset 705. Additionally, in some embodiments, the tracking module 745 may use portions of information to predict a future position of the headset 705. The tracking module 745 provides the head-tracking data inclusive of the estimated and/or predicted future position of the headset 705 to the engine 735.

The engine 735 also executes applications within the system environment and receives depth information from the depth estimation system 720, position information, acceleration information, velocity information, predicted future positions, or some combination thereof, of the headset 705 from the tracking module 745. Based on the received information, the engine 735 determines content to provide to the headset 705 for presentation to the user. For example, if the received information indicates that the user has looked to the left, the engine 735 generates content for the headset 705 that mirrors the user's movement in a virtual environment or in an environment augmenting the local area with additional content. Additionally, the engine 735 performs an action within an application executing on the console 710, in response to any inputs received from headset 705, and provides feedback to the user that the action was performed. The provided feedback may be visual via the headset 705. In response, the engine 735 may perform one or more of the actions in the command and/or generate subsequent content to be provided to the headset 705 based on the commands.

Additional Configuration Information

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A method comprising:
capturing, via a first camera, a first image that includes a plurality of light channels;
capturing, via a second camera, a second image that includes the plurality of light channels;
in a first light channel of the plurality of light channels, calculating a census transform for each pixel of the first image to form a first set of census transforms and a census transform for each pixel of the second image to form a second set of census transforms;
in a second light channel of the plurality of light channels, calculating a census transform for each pixel of the first image to form a third set of census transforms and a census transform for each pixel of the second image to form a fourth set of census transforms; and
generating a depth map based on the first set of census transforms, the second set of census transforms, the third set of census transforms, and the fourth set of census transforms.

2. The method of claim 1, wherein generating the depth map comprises:
along each scanline of a plurality of scanlines, comparing the first set of census transforms to the second set of census transforms and the third set of census transforms to the fourth set of census transforms; and
determining a stereo correspondence between the pixels of the first image and the pixels of the second image based on the comparisons;
wherein the depth map is generated based on the stereo correspondence.

3. The method of claim 2, wherein, along each scanline, comparing the first set of census transforms to the second set of census transforms and the third set of census transforms to the fourth set of census transforms comprises:
for a first pixel in the first image and a second pixel in the second image:
calculating a first Hamming distance for the first light channel between the census transform of the first pixel and the census transform of the second pixel;
calculating a second Hamming distance for the second light channel between the census transform of the first pixel and the census transform of the second pixel; and
summing the Hamming distances;
wherein the stereo correspondence is determined in part by minimizing the sum of the Hamming distances.

4. The method of claim 2, wherein generating the depth map further comprises:
for each scan direction of a plurality of scan directions:
along each scanline of a plurality of scanlines in the scan direction, comparing the first set of census transforms to the second set of census transforms and the third set of census transforms to the fourth set of census transforms;
wherein the stereo correspondence between the pixels of the first image and the pixels of the second image is based on the comparisons in each scan direction.

5. The method of claim 1, wherein the at least two light channels includes at least two different color channels.

6. The method of claim 1, wherein the at least two light channels includes a color channel and an infrared channel.

7. The method of claim 1, further comprising:
for any remaining light channels of the plurality of light channels, calculating a census transform for each pixel of the first image to form first additional sets of census transforms and a census transform for each pixel of the second image to form second additional sets of census transforms;
wherein generating the depth map based in part on the first set of census transforms, the second set of census transforms, the third set of census transforms, and the fourth set of census transforms is further based on the first additional sets of census transforms and the second additional sets of census transforms.

8. The method of claim 1, further comprising:
determining a contrast value for each of the plurality of light channels; and
selecting at least two light channels that have a highest contrast value, wherein the selected at least two light channels are the first light channel and the second light channel.

9. The method of claim 1, wherein calculating the census transforms for the first image is performed on a first camera sensor of the first camera and wherein calculating the census transforms for the second image is performed on a second camera sensor of the second camera.

10. The method of claim 1, wherein generating the depth map comprises:
inputting the first set of census transforms, the second set of census transforms, the third set of census transforms, and the fourth set of census transforms into a model, the model comprising:
a plurality of parameters trained according to census transforms in each of the plurality of light channel for pixels in stereo pairs of images with a ground truth depth map for each stereo pair; and
determining, by the model, the depth map based on the parameters and the first set of census transforms, the second set of census transforms, the third set of census transforms, and the fourth set of census transforms.

11. The method of claim 1, wherein virtual content is generated to be displayed on an electronic display based on the depth map.

12. A non-transitory computer-readable storage medium storing instructions that, when executed by a processor, cause the processor to perform steps of:
capturing, via a first camera, a first image that includes a plurality of light channels;
capturing, via a second camera, a second image that includes the plurality of light channels;
in a first light channel of the plurality of light channels, calculating a census transform for each pixel of the first image to form a first set of census transforms and a census transform for each pixel of the second image to form a second set of census transforms;
in a second light channel of the plurality of light channels, calculating a census transform for each pixel of the first image to form a third set of census transforms and a census transform for each pixel of the second image to form a fourth set of census transforms; and
generating a depth map based on the first set of census transforms, the second set of census transforms, the third set of census transforms, and the fourth set of census transforms.

13. The storage medium of claim 12, wherein generating the depth map comprises:
along each scanline of a plurality of scanlines, comparing the first set of census transforms to the second set of census transforms and the third set of census transforms to the fourth set of census transforms; and
determining a stereo correspondence between the pixels of the first image and the pixels of the second image based on the comparisons;
wherein the depth map is generated based on the stereo correspondence.

14. The storage medium of claim 13, wherein, along each scanline, comparing the first set of census transforms to the second set of census transforms and the third set of census transforms to the fourth set of census transforms comprises:
for a first pixel in the first image and a second pixel in the second image:
calculating a first Hamming distance for the first light channel between the census transform of the first pixel and the census transform of the second pixel;
calculating a second Hamming distance for the second light channel between the census transform of the first pixel and the census transform of the second pixel; and
summing the Hamming distances;
wherein the stereo correspondence is determined in part by minimizing the sum of the Hamming distances.

15. The storage medium of claim 12, wherein the instructions that, when executed by a processor, cause the processor to perform additional steps of:
determining a contrast value for each of the plurality of light channels; and
selecting at least two light channels that have a highest contrast value, wherein the selected at least two light channels are the first light channel and the second light channel.

16. A depth estimation system comprising:
a first camera configured to capture images in a plurality of light channels;
a second camera configured to capture images in the plurality of light channels; and
a controller configured to perform operations comprising:
in a first light channel of the plurality of light channels, calculating a census transform for each pixel of a first image captured by the first camera to form a first set of census transforms and a census transform for each pixel of a second image captured by the second camera to form a second set of census transforms;
in a second light channel of the plurality of light channels, calculating a census transform for each pixel of the first image to form a third set of census transforms and a census transform for each pixel of the second image to form a fourth set of census transforms; and
generating a depth map based on the first set of census transforms, the second set of census transforms, the third set of census transforms, and the fourth set of census transforms.

17. The depth estimation system of claim 16, wherein generating the depth map comprises:

along each scanline of a plurality of scanlines, comparing the first set of census transforms to the second set of census transforms and the third set of census transforms to the fourth set of census transforms; and determining a stereo correspondence between the pixels of the first image and the pixels of the second image based on the comparisons;

wherein the depth map is generated based on the stereo correspondence.

18. The depth estimation system of claim 17, wherein, along each scanline, comparing the first set of census transforms to the second set of census transforms and the third set of census transforms to the fourth set of census transforms comprises:

for a first pixel in the first image and a second pixel in the second image:

calculating a first Hamming distance for the first light channel between the census transform of the first pixel and the census transform of the second pixel;

calculating a second Hamming distance for the second light channel between the census transform of the first pixel and the census transform of the second pixel; and summing the Hamming distances;

wherein the stereo correspondence is determined in part by minimizing the sum of the Hamming distances.

19. The depth estimation system of claim 16, the controller configured to perform additional operations comprising:

for any remaining light channels of the plurality of light channels, calculating a census transform for each pixel of the first image to form first additional sets of census transforms and a census transform for each pixel of the second image to form second additional sets of census transforms;

wherein generating the depth map based in part on the first set of census transforms, the second set of census transforms, the third set of census transforms, and the fourth set of census transforms is further based on the first additional sets of census transforms and the second additional sets of census transforms.

20. The depth estimation system of claim 16, the controller configured to perform additional operations comprising:

determining a contrast value for each of the plurality of light channels; and selecting at least two light channels that have a highest contrast value, wherein the selected at least two light channels are the first light channel and the second light channel.

* * * * *